United States Patent Office 3,652,712
Patented Mar. 28, 1972

3,652,712
PLASTICIZATION OF AMINO COMPOUNDS WITH HYDROLYZED COPOLYMERS OF VINYL MONO-CARBOXYLATE AND PRODUCTS THEREOF
Muktar Ahmed, 3310 Mordecai, Durham, N.C. 27705, and Victorin Mallet, 70 Steadman St., Moncton, New Brunswick, Canada
Filed Nov. 27, 1968, Ser. No. 779,537
Int. Cl. C08f 19/10
U.S. Cl. 260—837 PV        8 Claims

ABSTRACT OF THE DISCLOSURE

A dyeable and anti-static plastic composition produced by heating an intimate mixture of a non-volatile amino compound having a melting temperature lower than 150° C., with an hydrolyzed copolymer of vinyl monocarboxylate and another α-monoethylenically unsaturated compound copolymerizable therewith, the said hydrolyzed copolymer having hydroxyl groups on from 5% to 50% of the carbon atoms in the copolymer chain, the proportion by weight of said amino compound to said hydrolyzed copolymer being from 1:200 parts by weight to 200:1 parts, the said heating occuring above the melting points of said amino compound and said hydrolyzed copolymer and the process of making the same. If desired, an epoxy compound may be reacted with the product.

---

Figure 1:
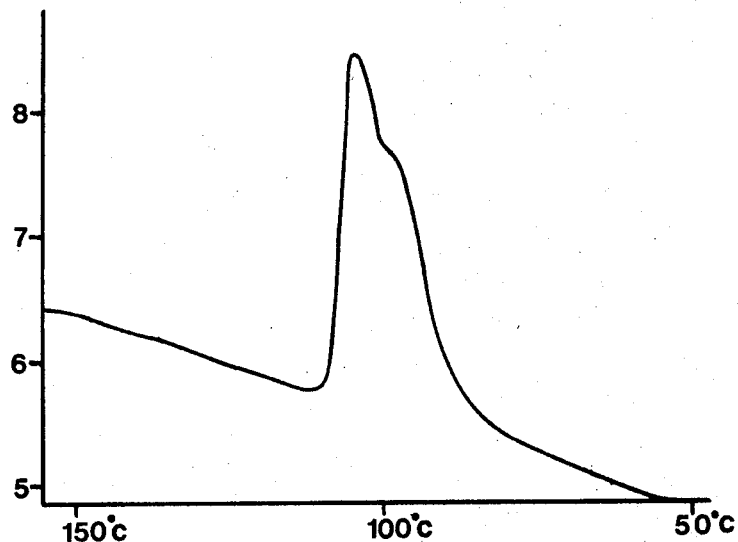
Figure 2:
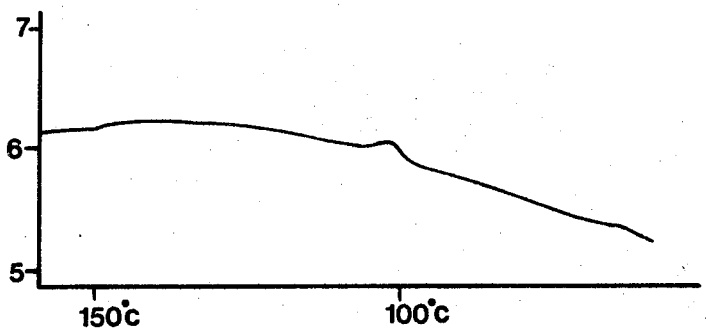
Figure 3:
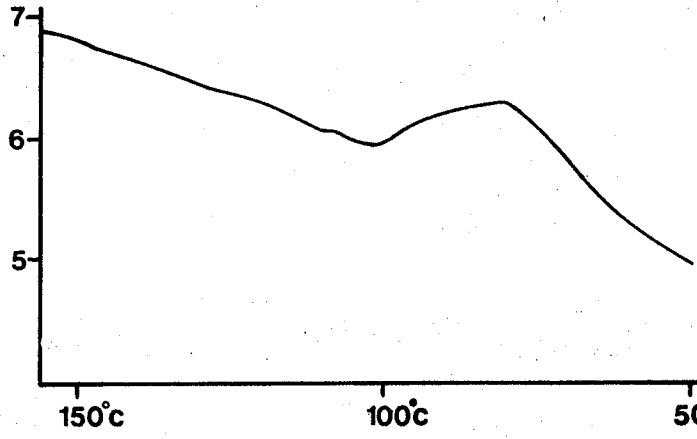

This invention relates to new polymeric products obtained by heating amino compounds with hydrolyzed copolymers of vinyl carboxylates containing α-monoethylenically unsaturated compounds copolymerizable therewith and the process of making the same.

It has already been described in Dr. Ahmed's application, Ser. No. 549,147, filed on May 11, 1966, issued as United States Pat. 3,454,512, that beneficial effects are obtained when polypropylene is melt extruded with hydrolyzed polyesters and a thermoplastic polyamide.

It has now been found that when an intimate mixture of an amino compound with an hydrolyzed copolymer of a vinyl monocarboxylate and an α-monoethylenically unsaturated compound copolymerizable therewith are heated together, a product is obtained which may be used in the preparation of adhesive, surface coatings, pliable films, molded articles, reinforced polymeric materials, fibres, finishes for metals, wood and fabrics, elastic films and fibres, self-supported films, insulation and for other similar uses. The amino compounds and the copolymer lose their separate identity and a one phase coherent mass is obtained resulting from a strong plasticization effect, the said mass being dyeable and anti-static.

THE AMINO COMPOUNDS

The amino compounds which may be used in accordance with the invention are non-volatile low molecular weight as well as high molecular weight and polymeric as well as non-polymeric organic compounds, having at least one and preferably two or more amino group per molecule. The amino compounds must have a melting temperature of 150° C. or less. They may be represented by the general formula $R_1$—NH—$R_2$ where $R_1$ is hydrogen, or both $R_1$ and $R_2$ are the same or different members selected from the class consisting of alkyl, cycloalkyl, aralkyl, aryl, of short or long chain groups which have up to 200 carbon atoms and in which one or more of the hydrogen atoms of the group may be replaced by hydroxyl or dialkylamino groups; or heterocyclic dialkylamino groups; or $R_1$ and $R_2$ may be combined together through an intermediary carbon, nitrogen or hydrogen atoms to form a heterocyclic ring; or $R_1$ and $R_2$ constitute a polyamide or N-substituted chain for a polyethylene amine chain of up to 50 repeating units. The preferred amino compounds for this invention are polyamides which comprise long chain molecules, having several amino groups along the chain molecule and a molecular weight between 500 to 10,000. Examples of such polymeric materials are polyethyleneamines, and polyamides prepared by condensation of dibasic fatty acids with polyamines. Examples of other amino compounds include monoethanolamine; diethanolamine; 2-aminopyridine; 1:1-dimethylhydrazine; propylene diamine and pyrrolidine; and commercial compounds known as, for instance; "Versamid 115" (trademark); and "Versamid 140" (trademark).

THE HYDROLYZED COPOLYMERS OF VINYL MONOCARBOXYLATE

The hydrolyzed copolymers of vinyl monocarboxylates are those resulting from the hydrolysis of copolymers of vinyl-esters of organic monocarboxylic acids free from ethylenic unsaturation, such as vinyl acetate; vinyl formate; vinyl propionate, vinyl stearate; vinyl benzoate, with at least another α-monoethylenically unsaturated compound copolymerizable therewith to produce copolymers which have high molecular weights, as distinguished from dimers and trimers. The α-monoethylencially unsaturated copolymerizable compounds include the vinyl and vinylidene compounds—that is, open chain monoethylenically unsaturated compounds having a terminal methylene group, such as, methyl acrylate; methylmethacrylate; acrylonitrile; methacrylonitrile; vinylchloride; vinylbromide; vinylidene halides; ethylene; propylene; isobutylene and methyl vinyl ketone.

In the copolymer, the ratio of vinyl monocarboxylates to α-monoethylenically unsaturated compound is generally from 10:90 up to 40:60 by weight. This ratio is preferred, as lower values reduce the plasticization reaction and upper values bring about brittleness and thermolability of the product.

The copolymer may be prepared, for instance, by copolymerizing ethylene and an organic vinyl ester, such as, vinylacetate in the presence of a peroxygen catalyst. Thereafter, the hydrolysis of the copolymer (also called the alcoholysis), may be carried out by dissolving the copolymer in an alcohol, such as butanol or in a mixture of an alcohol and a hydrocarbon such as toluene, and then treating with a suitable hydrolyzing agent or catalyst, such as an alkali hydroxide or a mineral acid. According to the need, the hydrolysis conditions may be selected to obtain either partial or complete hydrolysis of the copolymer. Generally, copolymers of vinyl monocarboxylates which have hydroxyl groups on at least 5% of the carbon atoms of the polymeric chain form readily compatible blends with low melting amino compounds. Preferably, the number of hydroxyl group should be above 5% but less than 50% of the number of carbon atoms in the polymeric chain of the copolymers, since copolymers having hydroxyl groups less than 5% are less compatible, and those having 50% hydroxyl groups are heat sensitive.

The hydrolyzed copolymers of vinyl monocarboxylates and α-monoethylenically unsaturated compounds copolymerizable therewith, have generally a molar ratio of the monocarboxylate to the alcohol derived from the monocarboxylate of from 15:1 to 1:15.

RATIO OF THE AMINO COMPOUND TO THE HYDROXYZED COPOLYMER

The amount of amino compounds which may be used with the hydrolyzed copolymers of vinyl monocarboxylates, may vary within wide ranges, generally between 1:200 parts to 200:1 may be used and preferably between 1 part to 25 parts and 25 to 1.

THE INTIMATE MIXTURE

The intimate mixture may be obtained by first mixing or blending the above described hydrolyzed copolymer of vinyl monocarboxylate with the amino compound and heating the said mixture above the melting points of said amino compound and said copolymer. Milling on a rubber mill at temperatures varying from about 50° C. to 200° C. for instance, according to the nature of the copolymer and the amino compound, is a convenient method of obtaining compatible and thoroughly mixed compositions. In order to produce films, the intimate mixture may be obtained by mixing solutions of the two components followed by removal of the solvents, such as by evaporation, drying, etc. In insoluble products are desired, a small amount of epoxy compound is generally incorporated in the composition, which is then baked at suitable temperature.

TENTATIVE EXPLANATION

On heating a hydrolyzed copolymer of vinyl monocarboxylate with the amino compound, a physico-chemical interaction appears to take place, rather than a chemical reaction. This interaction appears to be of a nature similar to the plasticization of polyvinyl chloride with phthalates plasticizers. The hydroxyl groups remain in the product but they are strongly "solvated" with the amino groups present. By this plasticization effect, both components lose their separate physical properties and yet retain their chemical reactivities.

OTHER TREATMENTS

The resulting products containing mixtures of amino compounds with hydrolyzed copolymers, for example, hydrolyzed copolymers of ethylene and vinylacetate, are useful for many purposes without further treatment. If desired, however, the products which may take the form of molded articles, coated fabrics, etc., may be further treated by baking or curing in the presence of acid catalyst or a small amount of diepoxide epoxy compounds. This aftertreatment applies especially to products derived from polyamino compounds containing more than a single amino group per molecular chain. Such treatment, it has been found, often results in improved elasticity, solvent, water and heat resistance. The amount of such additives generally vary from a fraction of a percent to 5% or more, based on the weight of the amino compounds, depending on the strength of the acid and the epoxide value of the epoxy compound used.

THE PRODUCTS

The products are useful in many applications where a strong metal to metal, glass to glass, wood to wood, and plastic to plastic adhesion, or any combination of these substrates is required. By using these products in molten or solution form, a number of materials can be bonded to one another to form useful products.

Generally, a curing operation is not required for adhesive application; however, curing, baking, or cross-linking operations may be used if desired, and they are completely in accordance with the spirit of this invention.

Molded articles of polypropylene, polyethylene or polystyrene which contain 5% to 25% of the composition of the product have higher shock resistance and better printability.

The products may also be used as such or with a melt-extrudable polymer to spin fibres from a melt. The inclusion of up to 10% of other additives, such as colouring matter, heat stabilizers, dulling agents, insolubilizing agents, cross-linking agents, etc., may be added into the spinning melt, or dope or dispersion if the products are in solution. The fibres resulting therefrom may be stretched cold or hot to several times their length; if desired, they may be baked, or given any mild chemical treatment to produce special effects.

The products may be used also in an amount of 2 to 25% by weight as modifiers in the manufacture of fibres such as ethylene, polyesters, and cellulose triacetate and the like to improve their dyeabilities and printabilities. The incorporation of the two products may also help the processability of the bulk polymers and improve the antistatic properties of fibres.

The products may also be used in an amount of about 5% to 25% by weight with other polymers to make film or tape materials which may be fibrillated subsequently by stretching and/or other mechanical action, as is known in the art. When polyolefins such as polyethylenes are used as the bulk material for the production of such fibrillated materials, the products become easily dyeable with acid, premetallized, disperse and vat dyes.

These compositions could be used in the production of polyethylene and polypropylene films useful in the packaging industry where they may be easily printable by conventional techniques.

The cured products of this invention have increased solvent and water resistance, and in general, greater toughness and hardness than the polymers of the blend taken individually. The products are considerably more pliable than the hydrolyzed copolymers. This combination of properties, characterizing the cured products, is of great value in applications where the individual polymers cannot be used. The toughness, hardness, increased water resistance and resistance to solvents, such as dry cleaning solvents, petroleum spirits, methanol, ethanol, etc., and temperature resistance are especially important in coatings and metal finishes.

The following examples will now serve to illustrate particular embodiments of the invention. Unless otherwise specified, the parts are given on a weight basis.

EXAMPLE I

Three parts of a finely divided substantially completely hydrolyzed ethylenevinyl acetate copolymer (HEVA) having ethylene to vinylacetate ratio of 6:4 by weight were mixed with 1 part of amino-containing polyamide (PA) "Versamid" (trademark) which had a viscosity of 8 poises at 75° C. and an amine value of 345.

The polyamide "Versamid" (trademark) used, is a product resulting from the reaction of a dibasic fatty acid, such as $HOOC—R_1—COOH$ where $R_1$ can be $(CH_2)_4$ to $(CH_2)_{20}$, with various polyamines, such as described in U.S.P. 2,379,413. The viscosity of the (PA) depends upon the value of $R_1$ and the molecular weight of the condensation product, and the amine value depends upon the value of the polyamine and the degree of condensation.

The blended polymers were thoroughly mixed at room temperature in a mortar. A part of this mixture was pressed into a thin film. For comparison purposes, a film was also prepared with the copolymer alone but without the amino compound. The properties of the two films were found to differ.

EXAMPLE II

An HEVA–PA composition was prepared as that in Example I but in 4:1 proportion. A thin film was pressed between two glass plates at 150° C. and cooled to room temperature. The two glass plates were joined very strongly with each other and could not be separated from each other without breaking. The joint was shock proof.

EXAMPLE III

Experiment II was repeated using aluminium blocks. The bond had a strength of 627 lbs./in.$^2$.

EXAMPLE IV

Experiment II was repeated with wooden blocks. The two parts could not be separated.

EXAMPLE V

5% "Araldite 508" (trademark), (a diepoxy resin and hardener) a Ciba product, was added to the composition of Example II, and the Experiment III repeated. After baking at 50° C. for ½ hour, the joint had a strength of 1750 lbs./in.$^2$.

EXAMPLE VI 10 parts of HEVA, used in Example I, were mixed with 1 part of polyethylene amine (same PA as used in Example I) in benzene to 10% solid concentration. A piece of cotton cloth was padded into this solution, dried, passed through a 50% acetone solution of a diepoxide "Epon 812" (trademark) for condensation products of epichlorohydrin and bisphenol-A (bis-p-hydroxyphenyl-bis-methyl methane) [(CH$_3$)$_2$C(C$_6$H$_3$OH)$_2$], and baked at 60° C. for ½ hour. The fabric acquired the properties of water repellency, oil resistance and flame retardency. It could be used as fabric material for lamp shades and table covering.

EXAMPLE VII

A thick red pigment coloured paste was prepared from the composite of Example II in benzene. A piece of jute fabric was thinly coated with this composition, dried and embossed hot. The fabrics was impervious to water and oils and is could be used for seat covering.

EXAMPLE VIII

Ten parts of composition of Example II was mixed in molten polypropylene and extruded into 10 d.p.f. fibre at 250° C. The fibres could be easily dyed with disperse, acid and premetallized dyes. The fibres which did not contain any composition of this invention resisted dyestuffs.

EXAMPLE IX

Ten parts of composition of Example VI were mixed with 100 parts of polypropylene and fibres were extruded from this blend. The resulting fibres after cold stretching could be deeply dyed with disperse, premetallized, acid, chrome, azoic, and vat dyes. The fibres of 100% PP were not dyeable.

EXAMPLE X

Ten parts of HEVA of Example I were mixed with 1 part of 2-aminopyridine and this composition added to 100 parts of low density polyethylene and melt-pressed into a thin film. The film had good mechanical properties and could be easily printed with conventional disperse dyes at 80–120° C.

EXAMPLES XI & XII

The composition of Example I but in HEVA/polyamide condensate ratio of 100/15 was extruded into 100 d.p.f. fibre at 150° C. (Example XI). A part of these fibres (Example XII) was treated with "EPON 812" (trademark), (an epoxy resin) at 60° C. for ½ hour. The mechanical properties observed are shown in Table I.

TABLE I

| Property | Example XI | XII |
|---|---|---|
| Tenacity (g./d.) | 0.80 | 1.2 |
| Elgonation (percent) | 600 | 269 |
| Yield stress (g./d.) | 0.47 | 0.90 |
| Yield strain (percent) | 4.6 | 8.0 |
| Immediate recovery (percent) | 88 | 89.6 |

EXAMPLE XIII

Generally, the solubility and plasticization effect of two polymer components can be deduced from the melting behaviour of their mixtures. Any physico-chemical interaction generally leads to the depression of melting point of the higher melting component, while in the case of non-interacting physical mixtures, the individual components retain their respective melting points. HEVA, and the polyamide "Versamid 115" (trademark), have been subjected to investigation to see if these components are present as a discrete mixture or if there is any interaction between these components when submitted to heat.

The hydrolyzed copolymer "Elvax–40" (trademark of a copolymer of ethylene and vinylacetate (HEVA), and the amino compound "Versamid 115," trademark of a grade of low molecular weight polyamide), were used for the experimental work reported here. Each component, as well as their mixture, was scanned in Perkin-Elmer DSC-1B. Differential calorimeter, under an inert atmosphere (nitrogen) as well as under oxygen, employing the following operational conditions:

Range: 8
Scan speed: 20° C./min.
Chart speed: 1"/min.

In FIGS. I, II, III, the temperature is indicated on the abscissa and the specific heat of the product under study is indicated in m.cal/second on the ordinate. FIGS. I, II, III represent, respectively, the melting behavior of HEVA, the polyamide "Versamid 115" (trademark), and a mixture containing 2 parts by weight of HEVA per part of the polyamide, under oxygen in the range of 50° C.–150° C. The corresponding DSC spectra under nitrogen were also scanned but they were essentially similar to FIGS. I, II, and III respectively. HEVA shows a fairly narrow endothermic fusion peak at about 104° C. (FIG. I) while the amino compound is a fluid all along this temperature range (FIG. II). When HEVA and the amino compound are thoroughly mixed and scanned, the melting peak appears at about 80° C. This observation is a clear indication of a physico-chemical interaction between the components of the mixture. This shows that HEVA and the amino compound are not present in two separate phases, but rather a one-phase system is indicated.

The embodiments of the invention in which an exclusive property or privilege is claimed are defined as follows:

1. A dyeable and antistatic plastic composition produced by heating an intimate mixture of a nonvolatile polyethylene amine having a molecular weight between 500 and 10,000, said polyethylene amine having a melting temperature lower than 150° C. with an hydrolyzed copolymer of a vinyl monocarboxylate selected from the group consisting of vinyl acetate, vinyl formate, vinyl propionate, vinyl stearate and vinyl benzoate and another α-monoethylenically unsaturated compound copolyerizable therewith, selected from the group consisting of methyl acrylate, methylmethacrylate, acrylonitrile, methacrylonitrile, vinylchloride, vinylbromide, vinylidene halides, ethylene, propylene, isobutylene and methyl vinyl ketone, the said hydrolyzed copolymer having hydroxyl groups on from 5% to 50% of the carbon atoms in the copolymer chain, the proportion by weight of said amino compound to said hydrolyzed copolymer being from 1.200 parts by weight to 200:1 parts, the said heating occurring above the melting points of said amino compounds and said hydrolyzed copolymer.

2. The product of claim 1 wherein said proportion is 1:15 to 15:1.

3. The product of claim 1 wherein said hydrolyzed copolymer is a vinyl acetate-ethylene copolymer.

4. The product of claim 1 wherein said proportion is 1:10 to 10:1.

5. An article having a coated film thereon of the product of claim 1.

6. The product of claim 1 which has been heat-treated with a diepoxide epoxy compound and thereby cured to become water-proof and solvent resistant.

7. An article having a coated film thereon of the product of claim 6.

8. The product of claim 6 wherein said article is an adhesive.

References Cited

UNITED STATES PATENTS

| 2,705,223 | 3/1955 | Renfrew et al. | 260—18 |
| 2,945,863 | 7/1960 | Buc et al. | 260—326.3 |
| 3,223,695 | 12/1965 | Gallaugher | 260—94.9 |
| 3,440,228 | 4/1969 | Errede | 260—87.3 |
| 3,464,949 | 9/1969 | Wartman et al. | 260—32.6 |
| 3,377,305 | 4/1968 | House | 260—27 |

FOREIGN PATENTS

| 591,515 | 8/1947 | Great Britain | 260—87.3 |
| 634,140 | 3/1950 | Great Britain | 260—87.3 |
| 1,066,017 | 4/1967 | Great Britain | 260—Anti-static E |

DONALD E. CZAJA, Primary Examiner

R. W. GRIFFIN, Assistant Examiner

U.S. Cl. X.R.

8—116.2; 117—122 PA, 161 ZB, 161 UN; 156—331; 161—192, 213, 270; 260—85.5 R, 85.7, 86.1 R, 87.1, 87.3, 830 R